United States Patent [19]
Wiebke, deceased et al.

[11] 4,439,214
[45] Mar. 27, 1984

[54] ADSORPTION DEVICE FOR THE DRY PURIFICATION OF GASES

[75] Inventors: Gunther Wiebke, deceased, late of Munich, Fed. Rep. of Germany, by Peter Wieloch, executor; Gunter Maurer, Munich, Fed. Rep. of Germany; Piet J. L. Laurijsen, LN Bedum, Netherlands; Roman Kurth, Wildpoldsried, Fed. Rep. of Germany

[73] Assignee: Elektroschmelzwerk Kempten GmbH, Munich, Fed. Rep. of Germany

[21] Appl. No.: 400,675

[22] Filed: Jul. 22, 1982

[30] Foreign Application Priority Data

Jul. 23, 1981 [DE] Fed. Rep. of Germany ....... 3129077

[51] Int. Cl.³ .............................................. B01D 53/04
[52] U.S. Cl. .......................................... 55/74; 55/387
[58] Field of Search ...................... 55/1, 74, 75, 385 R, 55/387, 389; 210/170

[56] References Cited

U.S. PATENT DOCUMENTS

| | | | |
|---|---|---|---|
| 154,645 | 9/1874 | Chase | 55/387 X |
| 1,989,206 | 1/1935 | Magill | 55/387 |
| 2,793,096 | 5/1957 | Pomeroy | 55/387 X |
| 3,854,912 | 12/1974 | Terrel et al. | 55/387 X |
| 4,201,663 | 5/1980 | Rollag et al. | 55/387 X |
| 4,224,147 | 9/1980 | Traut | 55/387 X |
| 4,276,164 | 6/1981 | Martone et al. | 210/170 |
| 4,345,581 | 8/1982 | Shach et al. | 210/170 X |

FOREIGN PATENT DOCUMENTS

| | | | |
|---|---|---|---|
| 507925 | 9/1953 | Belgium | 55/385 R |
| 318897 | 12/1918 | Fed. Rep. of Germany | 55/387 |
| 52-71372 | 6/1977 | Japan | 55/387 |
| 54-30267 | 3/1979 | Japan | 55/387 |
| 54-26511 | 9/1979 | Japan | 55/387 |
| 192523 | 8/1937 | Switzerland | 55/387 |

OTHER PUBLICATIONS

"Ullmanns Enzykopaedie der Technischen Chemie", 3rd Ed., 1964, vol. 15, pp. 516–520.

*Primary Examiner*—Robert H. Spitzer

[57] ABSTRACT

The invention is a device for the dry purification of gases under low pressure by adsorption of the impurities, particularly hydrogen sulfide, on a fixed bed of adsorbent material. The entire surface of the gas adsorbent material is spread as a loose layer on the ground and is covered with a gas-impermeable plastic or with a gas-impermeable fabric. Underneath the gas purifying adsorbent layer is a layer of gas-permeable material, in which are embedded gas-carrying pipes which are connected to a collecting pipe laid underground. Gas carrying pipes are arranged between the surface of the particulate adsorption layer and the cover.

16 Claims, 1 Drawing Figure

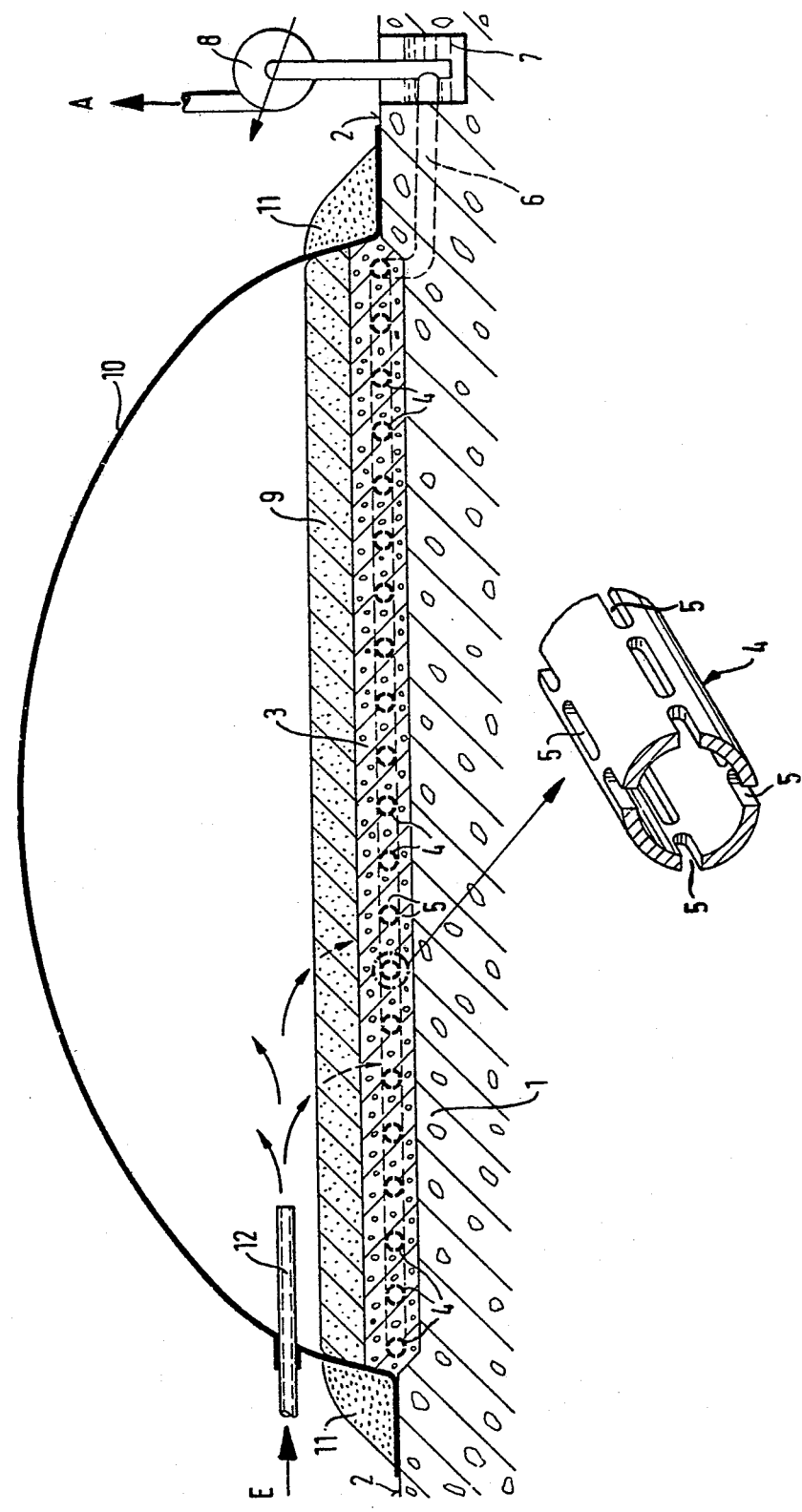

ADSORPTION DEVICE FOR THE DRY PURIFICATION OF GASES

It is known to purify CO-containing gases, which are obtained by conventional gasification methods or from waste gases in chemical reactions, to eliminate impurities, particularly hydrogen sulfide, which interfere with use as synthesis gas or which lead to pollution in the combustion of the gases.

One of the simplest and cheapest purification methods is dry purification under low pressure by adsorption of the impurities on an immobile gas purifying mass. These processes are generally known as fixed bed adsorption processes.

Fixed bed adsorption processes generally use adsorbents in particulate or granular form. The adsorbent selected is dependent on the type of impurities to be removed from the gas. Known adsorbents for the removal of hydrogen sulfide from gas streams are ferric hydroxides in the form of natural bog iron ore, synthetic adsorbents which are obtained by the pyrogenic decomposition of bauxite (known under the name Lux- or Lauta mass) and activated carbon and molecular sieves such as alkali- or alkaline earth aluminosilicates in the form of zeolites of natural or synthetic origin.

Originally, purifying plants for dry desulfurization of gas consisted of several series-connected box-shaped individual purifiers made of cast iron or steel. The adsorbent was spread on horizontal supports in the purifiers. Sealing of the cover was achieved by a revolving water seal or by a rubber gasket. In order to save space and material, the rectangular boxes were replaced by steel towers in which adsorbent was carried in removable flat trays. The trays, each with 2 layers of adsorbent, rest on supports of wood or steel. The gas enters the space between the two adsorbent layers of the trays, flows through the upper and/or lower adsorbent layer, and leaves the tray through an annular slot between the tray and the tower shell. The plants working under low pressure used water seals as closures and switching elements (see "Ullmanns Enzykopaedie der technischen Chemie" 3rd ed. 1964, vol. 15, p. 516–520).

Purifying towers are still used today for the dry desulfurization of fuel gases. Generally, at least 6 series-connected tower purifiers are required to reduce the amount of impurities to an acceptable level. When the adsorbent is spent, the adsorbent must be removed from the trays and replaced with fresh adsorbent. Removal of the spent adsorbent is difficult since it must be loosened by means of large drills or by hand by means of pneumatic tools.

The present invention is a simple device, which can be used for the dry purification of gases under low pressure by adsorption of the impurities on fixed gas purifying adsorbent without requiring metal containers such as steel towers or trays for the adsorbent, and where the removal of the spent adsorbent can be effected in a simple manner.

The adsorption device for the dry purification of gases under low pressure by an immobile, fixed bed gas purifying adsorbent according to the invention is characterized in that a sheet-like flexible cover of a gas-impermeable fabric which covers the entire surface of the gas purifying adsorbent and which margin is adjacent to the ground, is arranged above the gas purifying adsorbent spread on the ground, whereby gas carrying ducts are arranged underneath the cover and underneath the gas purifying adsorbent and connected to means for controlling the gas pressure. The gas pressure must be controlled to prevent the flexible cover from contacting the surface of the adsorbent or from being torn or to prevent gas from leaking around the edges of the cover.

The dimensions of the adsorption device, according to the invention, can be any convenient size, and is dependent on the amount of gas to be purified. The gas purifying adsorbent can be spread as a loose layer, to any convenient depth, on the ground. The bearing surface of the gas purifying adsorbent is preferably in the same plane with ground level or below it in an artificial depression. Depending on the nature of the ground, the ground can be sealed additionally with a gas-impermeable layer, e.g., a concrete layer, or with a plastic sheet.

The entire surface of the gas adsorbent is covered, according to the invention, with a gas-impermeable plastic foil or a gas-impermeable fabric. Pouring sand or earth on the borders or margins of the cover ensures that it is also gas-tight at the edges coming in contact with the ground or gas impermeable layer formed on the ground. The cover can be an impregnated fabric or canvas tarpaulin; preferred cover materials are plastic sheets of polyethylene or polyvinyl chloride in a thickness of 0.1 to 0.5 mm.

In addition, a layer of gas-permeable material can be arranged underneath the gas purifying adsorbent layer that is, between the bearing surface of the gas purifying layer and the ground. In addition, a layer of gas-permeable material can be arranged above the gas purifying layer that is, between the surface of the gas purifying layer and the cover. A granular material such as gravel, sand, granulated pumice or concrete grit, gravel in a grain size of about 7 mm, are particularly suitable for the gas permeable layer.

Gas carrying pipes are arranged underneath the cover and underneath the gas purifying adsorbent layer. The pipes are laid under the cover through openings in the cover itself or underneath the edges of the cover and under the gas purifying adsorbent layer and are connected to a regulator for controlling the gas pressure.

According to a preferred embodiment, the gas-carrying pipes arranged underneath the gas purifying adsorbent layer are embedded in a layer of gas-permeable material and communicate with a regulator for controlling the gas pressure.

In order to obtain uniform gas distribution in the gas purifying adsorbent layer, the pipes are preferably provided with lateral openings on the parts protruding under the cover and under the gas purifying adsorbent layer. These pipes can be made of iron, plastic or sintered materials, and can be perforated, porous or provided with slots.

The number of pipes arranged underneath the cover and underneath the gas purifying layer and their cross section depend on the gas throughput and on the size of the adsorption device. The direction of the gas flow inside the adsorption device, according to the invention, can be selected at random and can be changed, if necessary, from time to time to avoid the formation of channels in the gas purifying layer. The pressure loss by passage through the gas purifying layer is compensated for by the regulator for controlling the gas pressure. Preferably, the pressure regulation is effected at the gas outlet by connection to a vacuum-generating apparatus, like a fan or a centrifugal compressor. The total pressure is preferably so controlled that the pressure under the cover is about 0.1 to 1 mbar, which suffices for the self-support of the cover according to the principle of air-inflated structures.

A suitable embodiment of the adsorption device according to the invention will be described with reference to the drawing.

The drawing shows a schematic view of an adsorption device in a longitudinal section. As it can be seen, a gas-permeable gravel layer 3 is arranged on the ground 1 in an artificial depression relative to ground level 2. In the gravel layer 3 are embedded gas carrying pipes 4, which are provided with lateral slots 5 and connected with a collecting pipe 6 laid underground. Collecting pipe 6 is connected over a water separator 7 to a fan 8, which serves to control the gas pressure. The gas purifying adsorbent mass 9 is spread on gravel layer 3 as a loose poured layer whose surface is covered with a plastic sheet 10. Sheet 10 is sealed gas-tight to the outside by a sand pile 11 at the edges which come in contact with the ground at 2. Gas carrying pipe 12 enters through an opening in sheet 10. The gas flows in the direction of arrows E (gas inlet) and A (gas outlet).

By means of the adsorption device, according to the invention, whose dimensions are not critical and can be selected to suit operational requirements, dry purification of gases can be effected in a simple manner under low pressure conditions. For example, about 10,000 m$^3$ of gas can be purified per hour in a plant of the preferred embodiment according to the drawing of 20×20 meters with a layer thickness of the gas adsorbent material 9 of 0.5 m. The plant can be operated as a stationary open-air plant, without requiring shelter or protection in a building. Since the plant is freely accessible from all sides, the spent adsorbent can be removed and replaced with a simple cleaning or cleaning powered apparatus without requiring large drills or manually operated pneumatic tools.

We claim:

1. An adsorption device for the purification of gases which comprises a layer of particulate adsorbent material over the ground, a sheet-like flexible gas impermeable cover over the layer of adsorbent material said sheet-like flexible cover being in contact with the ground about its margin, means for introducing gases underneath the cover and means for removing the gases which have passed through the layer of adsorbent material from under the cover and pressure control means in communication with said device to control the gas pressure.

2. An adsorption device according to claim 1, wherein a layer of gas-permeable material is arranged underneath the layer of particulate adsorbent material.

3. An adsorption device according to claim 1, wherein a layer of gas-permeable material is arranged over the layer of particulate adsorbent material.

4. An adsorption device according to claim 2 or 3, wherein a granular material is used as the gas-permeable layer.

5. An adsorption device according to claim 4, wherein gravel or sand is the granular material.

6. An adsorption device according to claim 1, wherein the means for introducing the gas underneath the cover and for removing the gas which has passed through the adsorbent layer comprises pipes provided with lateral openings on the parts protruding under the cover and under the layer of adsorbent material.

7. An adsorption device according to claim 6, having gas-carrying pipe means arranged underneath the gas adsorbent layer embedded in a layer of gas-permeable material.

8. An adsorption device according to claim 1 or 2 which comprises pipe means for introducing the gas to be purified above the layer of particulate adsorbent material and pipe means underneath the layer of adsorbent material for removing the gases which have passed through the layer of adsorbent material.

9. An adsorption device according to claim 1, 2, 3 or 6 which further comprises a layer of gas impermeable material interposed between the ground and the layer of adsorbent material.

10. A device according to claim 9 wherein the gas impermeable material is concrete.

11. A device according to claim 9 wherein the gas impermeable material is a plastic material.

12. A device according to claim 1, 2, 3 or 6 wherein the cover is sealed about its margin directly to the ground.

13. A device according to claim 9, wherein the cover is sealed about its margin to a gas impermeable material.

14. A device according to claim 1, 2, 3 or 6 wherein the pressure control means comprises a gas pumping apparatus connected to the means for removing the gases which have passed through the layer of adsorbent material.

15. The apparatus of claim 14 wherein the gas pumping apparatus is a vacuum generating apparatus connected to means below the layer of adsorbent material for removing gas from underneath the cover which has passed downwardly through the layer of adsorbent material.

16. A method for dry purification of gases at low pressure by a fixed bed of adsorbent material which comprises: introducing the gas to be purified above the surface of a layer of particulate adsorbent material spread over the ground, the entire surface of said layer of adsorbent material being covered by a gas-impermeable flexible plastic foil whose margin is in contact with the ground, collecting the gas which has passed through the layer of adsorbent material underneath the layer of adsorbent material and passing the gas which has passed through the layer of adsorbent material outside the cover.

* * * * *